United States Patent
Arora et al.

(10) Patent No.: US 9,213,585 B2
(45) Date of Patent: Dec. 15, 2015

(54) CONTROLLING SPRINTING FOR THERMAL CAPACITY BOOSTED SYSTEMS

(71) Applicant: Advanced Micro Devices, Inc., Sunnyvale, CA (US)

(72) Inventors: Manish Arora, Dublin, CA (US); Nuwan Jayasena, Sunnyvale, CA (US); Michael Schulte, Austin, TX (US)

(73) Assignee: ADVANCED MICRO DEVICES, INC., Sunnyvale, CA (US)

(*) Notice: Subject to any disclaimer, the term of this patent is extended or adjusted under 35 U.S.C. 154(b) by 200 days.

(21) Appl. No.: 13/925,269

(22) Filed: Jun. 24, 2013

(65) Prior Publication Data
US 2014/0380329 A1   Dec. 25, 2014

(51) Int. Cl.
| | |
|---|---|
| G06F 9/46 | (2006.01) |
| G06F 15/00 | (2006.01) |
| G06F 9/50 | (2006.01) |
| G06F 1/20 | (2006.01) |
| G06F 1/32 | (2006.01) |
| G06F 9/30 | (2006.01) |

(52) U.S. Cl.
CPC ............. *G06F 9/5094* (2013.01); *G06F 1/206* (2013.01); *G06F 1/324* (2013.01); *G06F 9/30189* (2013.01); *G06F 9/5011* (2013.01)

(58) Field of Classification Search
CPC .......................... G06F 9/5011; G06F 9/30189
See application file for complete search history.

(56) References Cited

U.S. PATENT DOCUMENTS

2014/0317389 A1\* 10/2014 Wenisch et al. ............... 712/229

OTHER PUBLICATIONS

Raghavan et al. Computational Sprinting, In the Proceedings of the 18th Symposium on High Performance Computer Architecture (HPCA 2012), pp. 1-12.

\* cited by examiner

*Primary Examiner* — Camquy Truong
(74) *Attorney, Agent, or Firm* — Volpe and Koenig, P.C.

(57) ABSTRACT

A method and apparatus are described for performing sprinting in a processor. An analyzer in the processor may monitor thermal capacity remaining in the processor while not sprinting. When the remaining thermal capacity is sufficient to support sprinting, the analyzer may perform sprinting of a new workload when a benefit derived by sprinting the new workload exceeds a threshold and does not cause the remaining thermal capacity in the processor to be exhausted. The analyzer may perform sprinting of the new workload in accordance with sprinting parameters determined for the new workload. The analyzer may continue to monitor the remaining thermal capacity while not sprinting when the benefit derived by sprinting the new workload does not exceed the threshold.

15 Claims, 4 Drawing Sheets

CONTROLLING SPRINTING FOR THERMAL CAPACITY BOOSTED SYSTEMS

TECHNICAL FIELD

The disclosed embodiments are generally directed to computational "sprinting" techniques using thermal capacity to enable processors to temporarily exceed nominal power and performance ratings.

BACKGROUND

"Sprinting" refers to temporarily boosting processor performance beyond nominal levels. Computational sprinting may be used to activate a greater number of cores and/or operate at a higher frequency than otherwise possible in a multi-core processor in accordance with a particular thermal design. The frequency of the multi-core processor may be boosted using more cores or threads, and/or increasing the amount of available pipeline resources to yield better performance.

Even though a processor may have thermal headroom available, sprinting may be performed for the incorrect application or application phase. For example, sprinting benefits may be limited due to memory restrictions, a small amount of parallelism or a small amount of work.

A method and apparatus for making efficient sprinting decisions in a multi-core processor would be desirable in order to improve energy efficiency and sprinting effectiveness.

SUMMARY OF EMBODIMENTS

A method and apparatus are described for performing sprinting in a processor. An analyzer in the processor may monitor thermal capacity remaining in the processor while not sprinting. When the remaining thermal capacity is sufficient to support sprinting, the analyzer may perform sprinting of a new workload when a benefit derived by sprinting the new workload exceeds a threshold and does not cause the remaining thermal capacity in the processor to be exhausted. The analyzer may perform sprinting of the new workload in accordance with sprinting parameters determined for the new workload. The analyzer may continue to monitor the remaining thermal capacity while not sprinting when the benefit derived by sprinting the new workload does not exceed the threshold.

A processor may include a plurality of thermal sensors and an analyzer in communication with the thermal sensors. The analyzer may be configured to monitor thermal capacity remaining in the processor while not sprinting. When the remaining thermal capacity is sufficient to support sprinting, the analyzer may perform sprinting of a new workload when a benefit derived by sprinting the new workload exceeds a threshold and does not cause the remaining thermal capacity in the processor to be exhausted.

A non-transitory computer-readable storage medium may be configured to store a set of instructions that, when executed, configure a manufacturing process used to manufacture a semiconductor device. The semiconductor device may comprise a plurality of thermal sensors, and an analyzer in communication with the thermal sensor. The analyzer may be configured to monitor thermal capacity remaining in the processor while not sprinting. When the remaining thermal capacity is sufficient to support sprinting, the analyzer may perform sprinting of a new workload when a benefit derived by sprinting the new workload exceeds a threshold and does not cause the remaining thermal capacity in the processor to be exhausted. The instructions may be Verilog data instructions or hardware description language (HDL) instructions.

BRIEF DESCRIPTION OF THE DRAWINGS

A more detailed understanding may be had from the following description, given by way of example in conjunction with the accompanying drawings wherein.

DETAILED DESCRIPTION OF EMBODIMENTS

A method and apparatus are described for determining when to sprint a multi-core processor, (e.g., when a processor having sufficient thermal capacity should be run at a higher frequency (e.g., 5 or 10 GHZ, rather than 2 GHZ)), and how long to sprint the processor.

Figure 1:
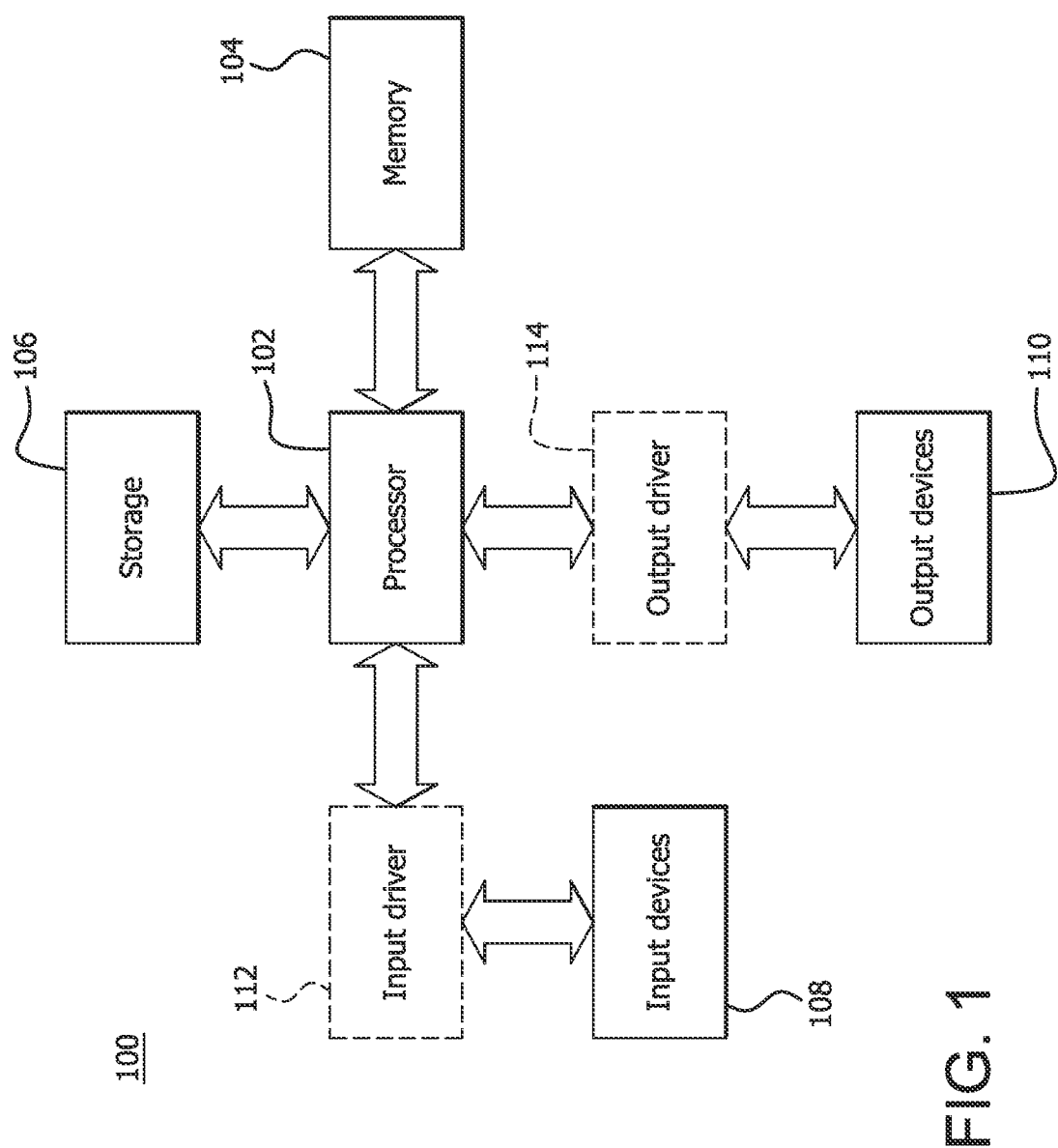
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
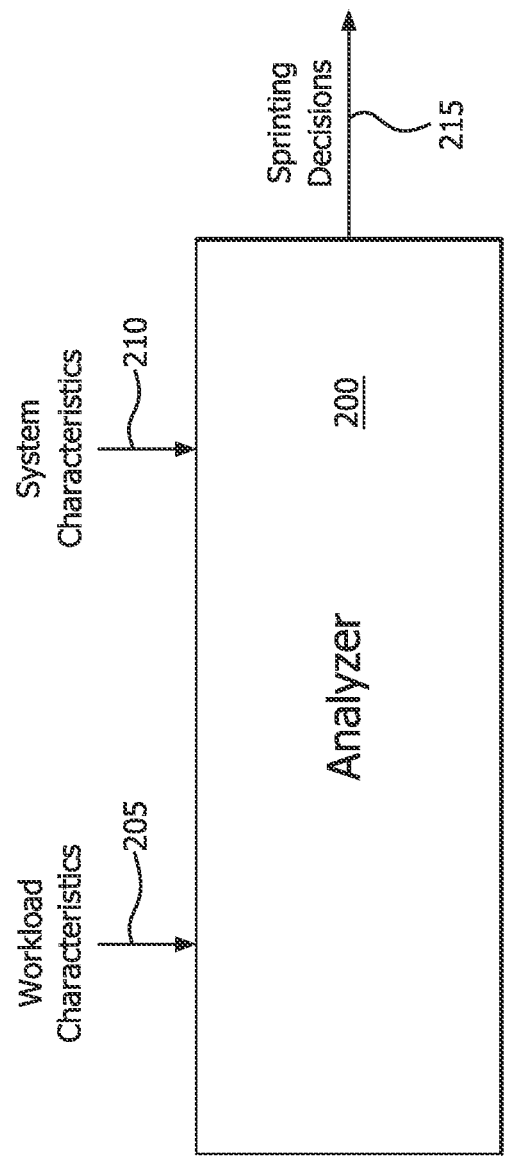
FIG. 2 shows an analyzer used in a multi-core processor, in accordance with some embodiments.

FIG. 2 shows an analyzer 200 used in a multi-core processor, in accordance with some embodiments. For example, the processor 102 in FIG. 1 may include a plurality of processors and the analyzer 200, in accordance with some embodiments. Workload characteristics 205 and system characteristics 210 are input into the analyzer 200, and sprinting decisions 215 are output from the analyzer 200 based on whether a significant benefit may be derived by sprinting such as, for example, at least one of reducing delay time to access memory, improvement in processing capability and speed, freeing up additional computational resources, and the like.

Figure 3:
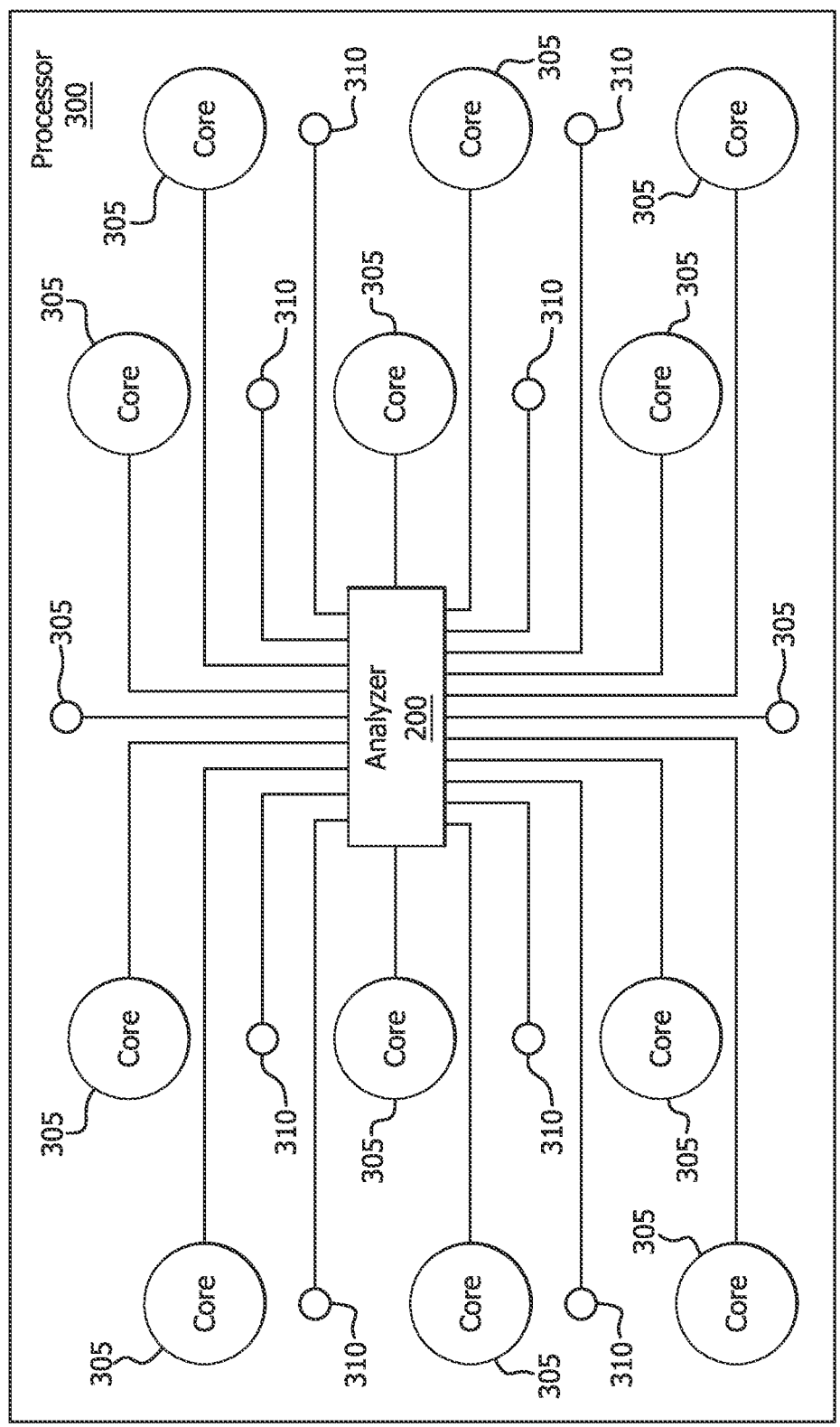
FIG. 3 shows a multi-core processor used in accordance with some embodiments.

FIG. 3 shows a multi-core processor 300 used in accordance with some embodiments. The processor 300 may include a plurality of cores 305 and thermal sensors 310.

Figure 4:
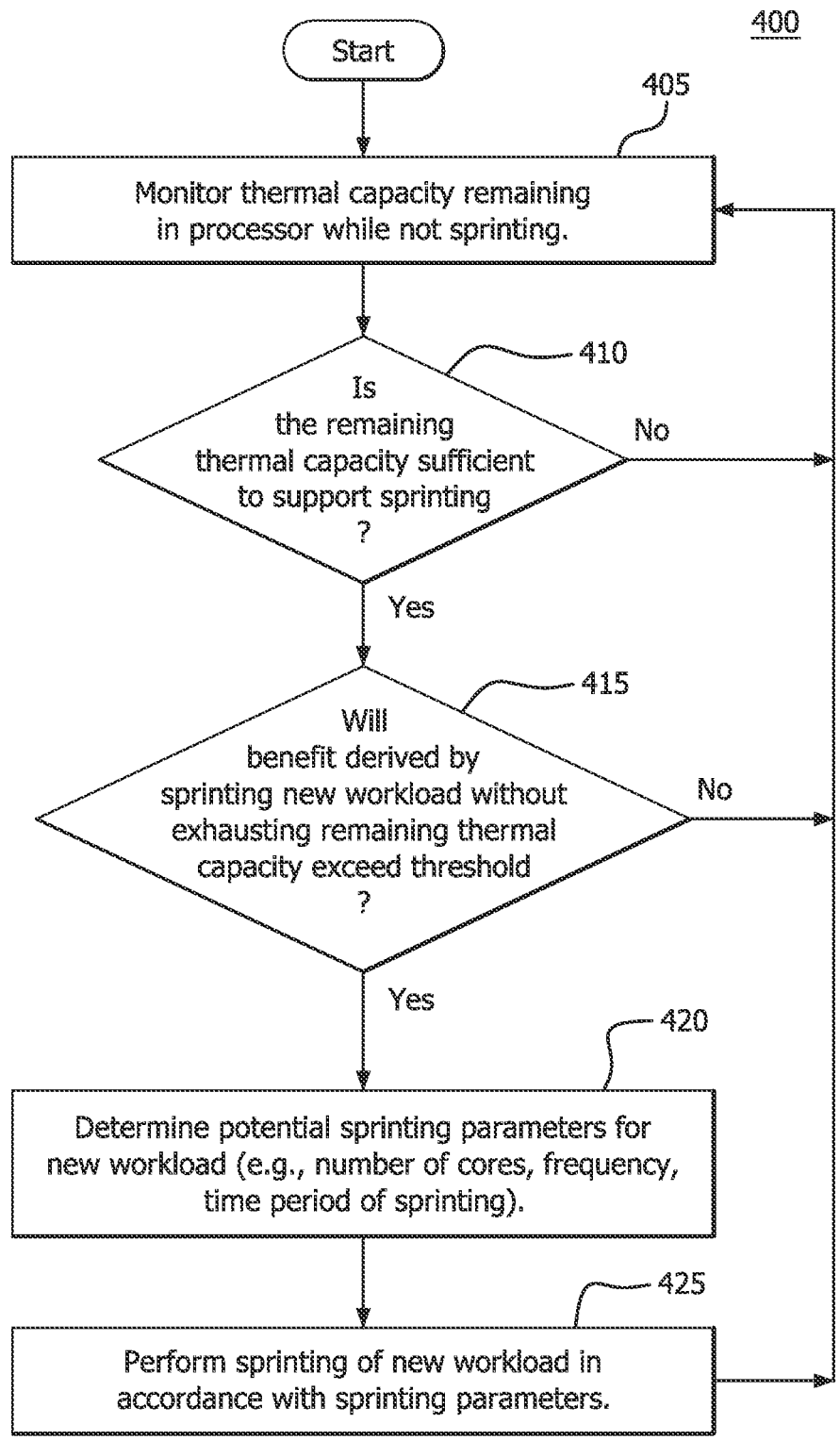
FIG. 4 is a flow diagram of a procedure for sprinting the processor of FIG. 3 in accordance with some embodiments.

FIG. 4 is a flow diagram of a procedure 400 for sprinting workloads using the processor 300 of FIG. 3 in accordance with some embodiments. As shown in FIG. 4, thermal capacity remaining in the processor 300 is monitored while not sprinting (405). A determination is made as to whether or not the remaining thermal capacity is sufficient to support sprinting (410). If the remaining thermal capacity is not sufficient to support sprinting, the procedure 400 returns to monitoring the remaining thermal capacity while not sprinting (405). If the remaining thermal capacity is sufficient to support sprinting, a determination is made as to whether or not a benefit derived by sprinting a new workload exceeds a predetermined threshold, without exhausting the remaining thermal capacity (415). If the benefit derived by sprinting the new workload will not exceed the threshold, the procedure 400 returns to monitoring the remaining thermal capacity while not sprinting (405). If the benefit derived by sprinting the new workload will exceed the threshold, potential sprinting parameters, (e.g., number of cores, frequency, time period of sprinting), for the new workload are determined (420). Sprinting of the new workload is then performed in accordance with the sprinting parameters (425).

The following embodiments may be used to make the determination as to whether or not a benefit may be derived by sprinting, and whether this benefit exceeds a predetermined threshold. The threshold will, of course, depend upon the benefit being measured. The processor may also decide the duration of the sprinting.

In one embodiment, a memory-bound or compute-bound workload characteristic may be used in deciding when to sprint and how long to sprint. If access to memory is constantly delayed, then reducing the frequency of the processor is not going to help because all its doing is stalling. "Memory-boundedness" indicates how much traffic there is and how much of the time the processor is waiting for memory versus actually performing computations. "Compute-boundedness" indicates whether the processor is performing computations or not. Thus, compute-bound of work load exhausts computational resources. As an example, a percentage (e.g., 50%) of peak instructions per cycle (IPC) may be used as a predetermined threshold to determine whether a significant benefit is derived by sprinting a new workload without exhausting the remaining thermal capacity of the processor. In this example, if the peak IPC is six (6), then it may be beneficial for the processor to perform sprinting for situations when the IPC of the processor is greater than three (3).

If the processor has more computational resources and no more are in use, the processor may experience an improvement in out-of-order processing or larger window sizes for determining out-of-order instruction scheduling. The processor may be able to support more available end users, or boost the frequency of different units within the processor because it is bound by the availability of those units. In the memory-bound case, however, the processor may wait for memory so that there is no point in boosting the frequency or enabling the same old byte line. Sprinting is not desired while the processor is memory-bound and is waiting on memory because no benefit is derived therefrom. However, if the processor is compute-bound, then sprinting may be desired.

In another embodiment, a workload characteristic based on an amount of parallelism in an application, or if the parallelism meets a certain threshold, may be used in deciding when to sprint and how long to sprint. Parallelism is the ability to perform different portions of a complex task at the same time. As an example, the number of independent software loops in a program may be used as a predetermined threshold to determine whether a significant benefit is derived by sprinting a new workload without exhausting the remaining thermal capacity of the processor. In this example, if the number of independent software loops exceeds 100, then it may be beneficial for the processor to perform sprinting.

Applications may substantially differ in the amount of parallelism that they offer. For example, if the processor is multiplying two matrix sheets together for one application, a substantial amount of parallelism in this workload may exist because all of the multiplications are independent of each other. For another application, there may not be enough parallelism when steps are performed sequentially. Dependencies may be changed to limit the amount of parallelism that occurs in an application. Thus, different applications may have varying degrees of parallelism. Sprinting may be desired if there is a large amount of parallelism in the application.

In another embodiment, a workload characteristic based on an amount of work to be performed may be used in deciding when to sprint and how long to sprint.

In another embodiment, a workload characteristic based on a type and an amount of resources needed, or other workload information, may be used in deciding when to sprint and how long to sprint. Thus, sprinting may be desired if there is a large amount of work that needs to be performed within a limited amount of time, or a specific type of work.

In another embodiment, a workload characteristic based on application phase change indicators may be used in deciding when to sprint and how long to sprint. Phases in the application refer to applications having different characteristics, whereby within frames they have similar characteristics, but across phases there are different characteristics. Phase change indicators provide a good indicator for determining whether or not to sprint at the beginning of a new phase or within the phase, since it is likely that once the phase, the application characteristics are probably going to remain the same until the phase ends. Thus, sprinting decisions may be performed at the beginning of new phases of an application, (e.g., once every 3 milliseconds).

In other embodiments, a detection mechanism based on static application, runtime application and/or input dataset profiling may be used in deciding when to sprint and how long to sprint.

In another embodiment, a detection mechanism based on observing performance counter information or observing micro-architecture state information may be used in deciding when to sprint and how long to sprint.

In another embodiment, a detection mechanism based on a compiler-driven task graph and/or dependency analysis or dynamic recompilation may be used in deciding when to sprint and how long to sprint.

In another embodiment, system characteristics based on estimates or real time information on residual thermal capacity or rate of temperature change of a processor may be used in deciding when to sprint and how long to sprint.

In another embodiment, system characteristics based on power/performance/leakage characteristics of compute units may be used in deciding when to sprint and how long to sprint.

In another embodiment, system characteristics based on estimated or real time information on current and power delivery headroom may be used in deciding when to sprint and how long to sprint.

In another embodiment, system characteristics based on an amount of time it takes to enter into sprinting and exit the sprinting state or other information may be used in deciding when to sprint and how long to sprint.

In accordance with some embodiments, a non-transitory computer-readable storage medium may be configured to store a set of instructions that, when executed, configures a manufacturing process used to manufacture a semiconductor device. The semiconductor device may comprise a plurality of thermal sensors, and an analyzer in communication with the thermal sensors. The analyzer may be configured to monitor thermal capacity remaining in the processor while not sprinting. When the remaining thermal capacity is sufficient to support sprinting, the analyzer may perform sprinting of a new workload when a benefit derived by sprinting the new workload exceeds a threshold and does not cause the remaining thermal capacity in the processor to be exhausted. The instructions may be Verilog data instructions or hardware description language (HDL) instructions.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the disclosed embodiments.

The methods or flow charts provided herein may be implemented in a computer program, software, or firmware incorporated in a computer-readable storage medium for execution by a general purpose computer or a processor. In some embodiments, the computer-readable storage medium does not include transitory signals. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of performing sprinting in a processor, the method comprising:
    monitoring thermal capacity remaining in the processor while not sprinting;
    determining whether or not the remaining thermal capacity is sufficient to support sprinting;
    when the remaining thermal capacity is determined to not be sufficient to support sprinting, returning to the monitoring of the thermal capacity remaining in the processor while not sprinting;
    when the remaining thermal capacity is determined to be sufficient to support sprinting, determining a benefit derived by sprinting a new workload based on one or more workload characteristics based on a type of resources and an amount of resources to be used for sprinting the new workload;
    determining whether or not the benefit derived by sprinting the new workload exceeds a threshold;
    when the benefit is determined to not exceed the threshold, returning to the monitoring of the thermal capacity remaining in the processor while not sprinting;
    when the benefit is determined to exceed the threshold, determining sprinting parameters, including when to sprint and how long to sprint, for the new workload; and
    performing sprinting of the new workload in accordance with the sprinting parameters.

2. The method of claim 1, wherein the sprinting parameters include a number of cores of the processor.

3. The method of claim 1, wherein a memory-bound or compute-bound workload characteristic, of the one or more workload characteristics, is used to determine when to sprint and how long to sprint.

4. The method of claim 1, wherein a workload characteristic, of the one or more workload characteristics, based on an amount of parallelism in an application is used in deciding when to sprint and how long to sprint.

5. The method of claim 1, wherein a workload characteristic, of the one or more workload characteristics, based on an amount of work to be performed is used in deciding when to sprint and how long to sprint.

6. The method of claim 1, wherein a workload characteristic, of the one or more workload characteristics, based on application phase change indicators is used in deciding when to sprint and how long to sprint.

7. The method of claim 1, wherein a detection mechanism based on at least one of a static application, a runtime application or input dataset profiling is used in deciding when to sprint and how long to sprint.

8. The method of claim 1, wherein system characteristics based on estimates or real time information on residual thermal capacity, or rate of temperature change of the processor, are used in deciding when to sprint and how long to sprint.

9. The method of claim 1, wherein the threshold is determined based on an amount of time the processor is waiting for access to memory compared to an amount of time to perform calculations.

10. A processor comprising:
    a plurality of thermal sensors; and
    an analyzer in communication with the thermal sensors, the analyzer configured to:
    monitor thermal capacity remaining in the processor while not sprinting;
    determine whether or not the remaining thermal capacity is sufficient to support sprinting;
    when the remaining thermal capacity is determined to not be sufficient to support sprinting, return to the monitoring of the thermal capacity remaining in the processor while not sprinting;
    when the remaining thermal capacity is determined to be sufficient to support sprinting, determine a benefit derived by sprinting a new workload based on one or more workload characteristics based on a type of resources and an amount of resources to be used for sprinting the new workload;

determine whether or not the benefit derived by sprinting the new workload exceeds a threshold associated with the new workload;

when the benefit is determined to not exceed the threshold, return to the monitoring of the thermal capacity remaining in the processor while not sprinting;

when the benefit is determined to exceed the threshold, including when to sprint and how long to sprint, determining sprinting parameters for the new workload; and perform sprinting of the new workload in accordance with the sprinting parameters.

11. The processor of claim 10, wherein the sprinting parameters include a number of cores of the processor.

12. The processor of claim 10, wherein system characteristics based on estimates or real time information on residual thermal capacity, or rate of temperature change of the processor, are used by the analyzer in deciding when to sprint and how long to sprint.

13. A non-transitory computer-readable storage medium configured to store a set of instructions that, when executed, configure a process of performing sprinting in a processor comprising:

monitoring thermal capacity remaining in the processor while not sprinting;

determining whether or not the remaining thermal capacity is sufficient to support sprinting;

when the remaining thermal capacity is determined to not be sufficient to support sprinting, returning to the monitoring of the thermal capacity remaining in the processor while not sprinting;

when the remaining thermal capacity is determined to be sufficient to support sprinting, determining a benefit derived by sprinting a new workload based on one or more workload characteristics based on a type of resources and an amount of resources to be used for sprinting the new workload;

determining whether or not the benefit derived by sprinting the new workload exceeds a threshold associated with the new workload;

when the benefit is determined to not exceed the threshold, returning to the monitoring of the thermal capacity remaining in the processor while not sprinting;

when the benefit is determined to exceed the threshold, determining sprinting parameters, including when to sprint and how long to sprint for the new workload; and and performing sprinting of the new workload, in accordance with the sprinting parameters.

14. The non-transitory computer-readable storage medium of claim 13 wherein the instructions are Verilog data instructions.

15. The non-transitory computer-readable storage medium of claim 13 wherein the instructions are hardware description language (HDL) instructions.

* * * * *